(12) United States Patent
Beyabani

(10) Patent No.: US 8,578,430 B2
(45) Date of Patent: Nov. 5, 2013

(54) THROTTLING VIDEO ON DEMAND (VOD) BASED ON USAGE

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 816 days.

(21) Appl. No.: 12/198,556

(22) Filed: Aug. 26, 2008

(65) Prior Publication Data

US 2010/0058401 A1    Mar. 4, 2010

(51) Int. Cl.
*H04N 7/173* (2011.01)
*H04H 60/33* (2008.01)

(52) U.S. Cl.
USPC .................. 725/90; 725/91; 725/93; 725/95; 725/96; 725/9; 725/10; 725/12

(58) Field of Classification Search
None
See application file for complete search history.

(56) References Cited

U.S. PATENT DOCUMENTS

| | | | | |
|---|---|---|---|---|
| 5,905,522 A * | 5/1999 | Lawler | ......................... | 725/131 |
| 7,540,012 B1 * | 5/2009 | Herzberg et al. | ............... | 725/87 |
| 2004/0123324 A1 * | 6/2004 | Sazzad et al. | ................... | 725/89 |
| 2005/0071882 A1 * | 3/2005 | Rodriguez et al. | .............. | 725/95 |
| 2009/0217326 A1 * | 8/2009 | Hasek | .............. | 725/87 |

* cited by examiner

*Primary Examiner* — Nasser Goodarzi
*Assistant Examiner* — Fred Peng

(57) ABSTRACT

A device receives, from one or more of a set-top box (STB) or a user device, usage information associated with video content and high definition video content, and calculates a cost factor, based on the usage information, for a customer associated with one or more of the STB or the user device. The device also compares the cost factor to a threshold, and receives, from one or more of the STB or the user device, a request for free video content. The device further one of provides reduced quality free video content to one or more of the STB or the user device when the cost factor exceeds the threshold, or blocks transmission of free high definition video content to one or more of the STB or the user device when the cost factor exceeds the threshold.

25 Claims, 11 Drawing Sheets

FIG. 9

| Customer Information 910 | STB/User Device ID 920 | No. HD-VODs 930 | No. VODs 940 | Free/Paid 950 | Daily Usage 960 |
|---|---|---|---|---|---|
| John Doe | ID1 | 5 | 1 | Paid | Low |
| Bob Smith | ID2 | 6 | 2 | Paid | Low |
| Fred Jones | ID3 | 7 | 3 | Free | High |

HIGH COST FACTOR (980)

970

900

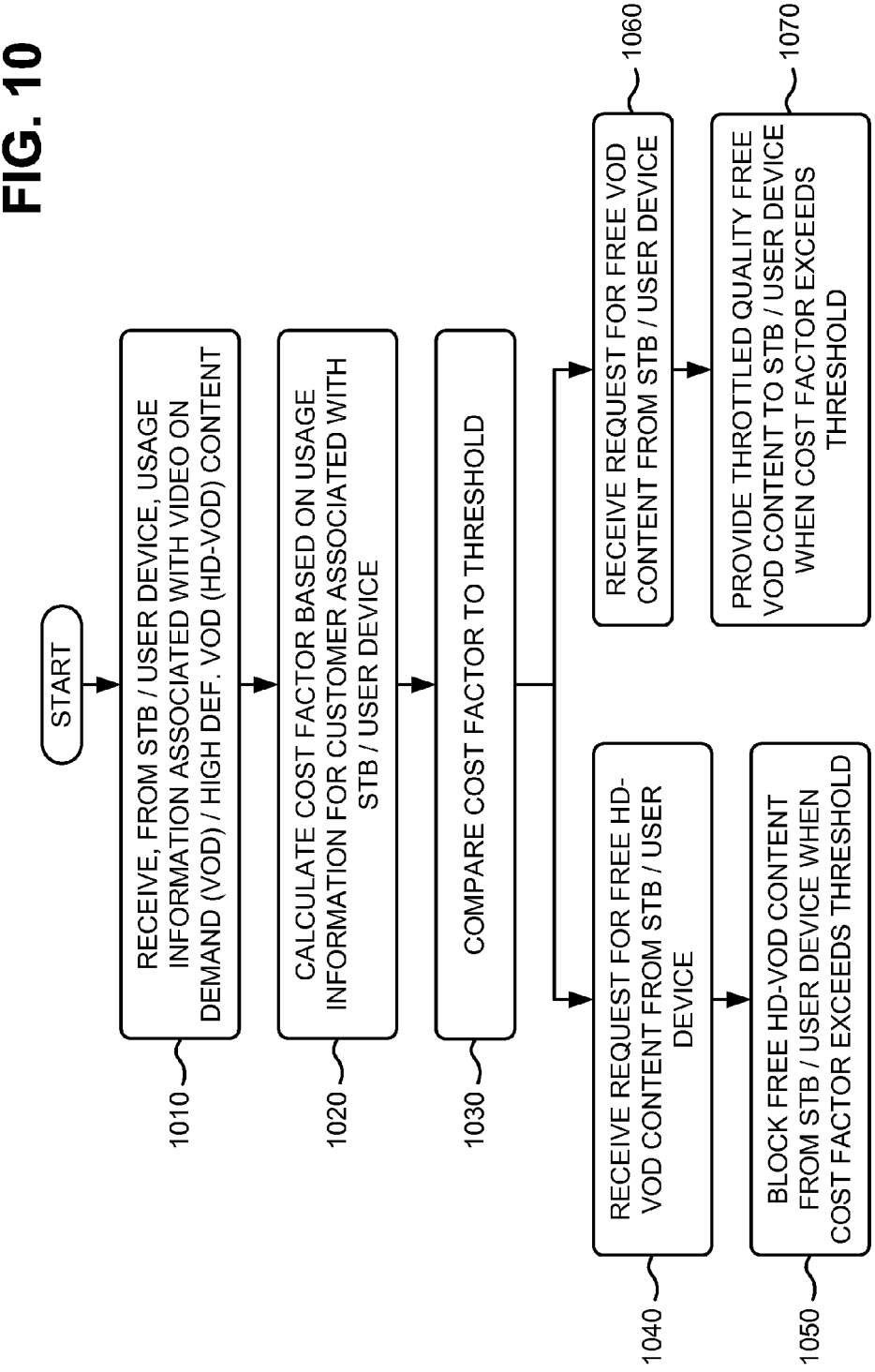

THROTTLING VIDEO ON DEMAND (VOD) BASED ON USAGE

BACKGROUND

Video on Demand (VOD) and/or high-definition VOD (HD-VOD) (also known as television (TV)-based VOD, on-demand television, movies-on-demand, content-on-demand, on-demand programming, VOD on the web, VOD on cable, pay-per-view (PPV), pay-as-you-go, Internet-on-demand video, entertainment-on-demand, etc.) may utilize the Internet, intranets, and/or a multitude of other networks. VOD content can be viewed using many different electronic devices, such as, telephones, personal digital assistants (PDAs), personal computers, set-top boxes (STBs), portable media devices, etc. VOD allows viewers to select video and its accompanying content, and have the video/content sent to their STB, personal computer, mobile telephone, etc. for viewing. If the VOD content is to be viewed on a TV, the video/content might be stored in a customer's digital video recorder (DVR). In such cases, the customer could watch the program retrieved from the DVR's hard drive. For cable television, the customer typically can watch VOD video/content directly from a network head-end.

Some VOD content is available free of charge (e.g., free movies, free HD movies, free television programming, etc.) in order to entice customers to purchase fee-based VOD content. However, some customers may only select free VOD content instead of purchasing the fee-based VOD content. These customers may be considered "expensive" or "costly" for VOD providers because they may not generate revenue for the VOD providers and may still take advantage of the free VOD content (e.g., which is paid for by the VOD producers). Furthermore, VOD content is susceptible to abuse. For example, hackers may bulk record free VOD content at no cost, and unauthorized users may receive fee-based VOD content with misappropriated purchase personal identification numbers (PINs) (e.g., numeric passwords used to control VOD purchases).

BRIEF DESCRIPTION OF THE DRAWINGS

FIG. 9 illustrates a diagram of a portion of an exemplary database capable of being provided in and/or managed by the server of the network depicted in FIG. 1; and FIGS. 10 and 11 illustrate flow charts of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable companies (e.g., companies providing video on demand (VOD) and/or high definition VOD (HD-VOD) content) to reduce or eliminate expensive customers (e.g., customers using primarily free VOD and/or HD-VOD content), circumvent bulk recording of free VOD and/or HD-VOD content by hackers, and/or reduce purchase PIN misuse by unauthorized users. In one implementation, for example, the systems and/or methods may receive, from a set-top box (STB) and/or a user device, usage information associated with VOD and/or HD-VOD content, may calculate a cost factor, based on the usage information, for a customer associated with the STB and/or the user device, and may compare the cost factor to a threshold. The systems and/or methods may receive a request for free HD-VOD content from the STB and/or the user device, and may block (e.g., transmission of) the free HD-VOD content to the STB and/or the user device when the cost factor exceeds the threshold. Alternatively and/or additionally, the systems and/or methods may receive a request for free VOD content from the STB and/or the user device, and may provide throttled quality free VOD content to the STB and/or the user device.

"Video on demand (VOD) content," as the term is used herein, is to be broadly construed to include, for example, subscription VOD (SVOD), TV-based VOD, on-demand television, movies-on-demand, content-on-demand, on-demand programming, VOD on the web, VOD on cable, pay-as-you-go (PAYG), pay-per-view (PPV), all day movies, live-streaming video and on-demand streaming video, Internet-on-demand video, Internet Protocol (IP)-based video, IPTV broadcasting, Internet high definition television (HDTV), Internet video, web video, video webcasting, webcasting, broadcast Internet, switched digital video (SDV), sports-on-demand, application-on-demand, entertainment-on-demand, information-on-demand, news-on-demand, on-demand services, television-on-demand, switched-on TV, anything-on-demand, a television programming package (e.g., a sports package that may include the NBA channel, the NFL network, ESPN classic, etc.), etc.

"High definition video on demand (HD-VOD) content," as the term is used herein, is to be broadly construed to include, for example, VOD content provided in a high definition format (e.g., at a higher resolution than standard television format).

As used herein, the terms "customer," "viewer," and/or "user" may be used interchangeably. Also, the terms "customer," "viewer," and/or "user" are intended to be broadly interpreted to include a user device, a STB, and/or a television or a user of a user device, STB, and/or television.

Figure 1:
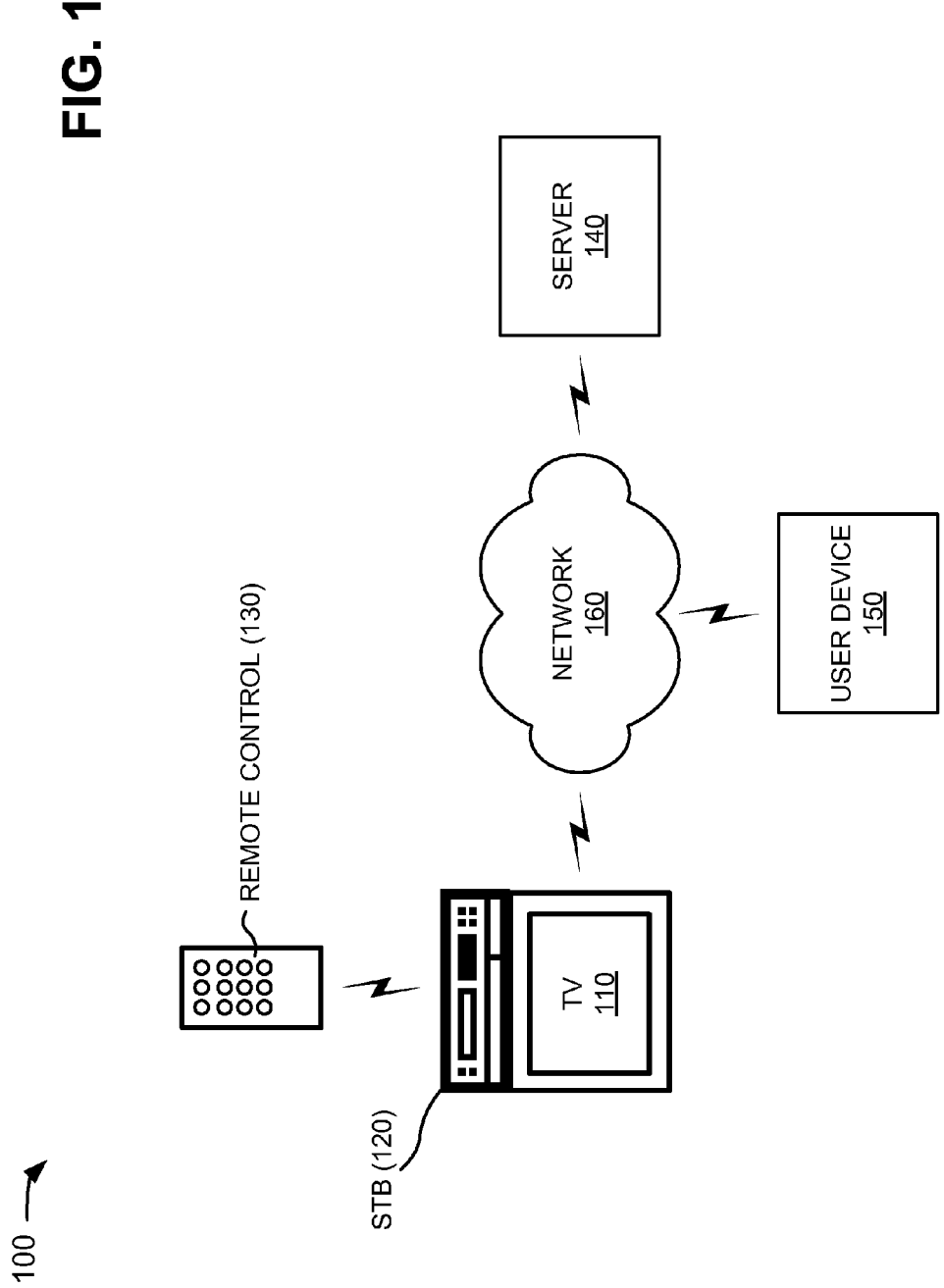
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a television (TV) 110, a STB 120, a remote control 130, a server 140, and a user device 150 interconnected by a network 160. Components of network 100 may interconnect via wired and/or wireless connections. A single television 110, STB 120, remote control 130, server 140, user device 150, and network 160 have been illustrated in FIG. 1 for simplicity. In practice, there may be more televisions 110, STBs 120, remote controls 130, servers 140, user devices 150, and/or networks 160. Also, in some instances, one or more of the components of network 100 may perform one or more functions described as being performed by another one or more of the components of network 100.

Television 110 may include a television monitor that is capable of displaying television programming, content provided by STB 120, and/or content provided by other devices (e.g., a digital video disk (DVD) player, a video camera, etc., not shown) connected to television 110.

STB 120 may include a device that receives television programming (e.g., from server 140), and provides the television programming to television 110 or another device. STB 120 may allow a user to alter the programming provided to television 110 based on a signal (e.g., a channel up or channel down signal) from remote control 130. STB 120 may record video in a digital format to a disk drive or other memory medium within STB 120. In one exemplary implementation, STB 120 may be incorporated directly within television 110 and/or may include a digital video recorder (DVR).

Remote control 130 may include a device that allows a user to control programming and/or content displayed on television 110 via interaction with television and/or STB 120.

Server 140 may include one or more server entities, or other types of computation or communication devices, that gather, process, search, and/or provide information in a manner described herein. In one implementation, server 140 may include a computer system, an application, a cable head-end, and/or a broadcasting device capable of providing content (e.g., VOD content, HD-VOD content, TV programming, movies, on-demand services, live television, etc.), advertisements, instructions, and/or other information to STB 120 and/or user device 150.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 150 may include any device (e.g., an Internet Protocol (IP)-based device) that is capable of accessing server 140 via network 160.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
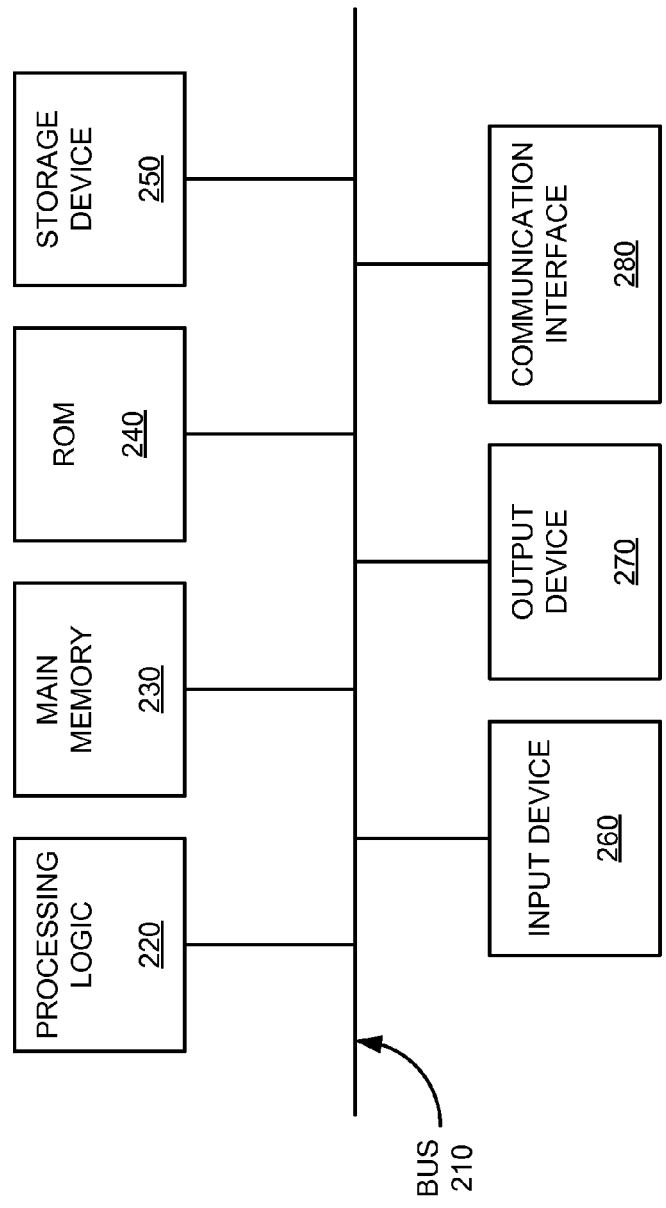
FIG. 2 illustrates exemplary components of a set-top box (STB), a server, and/or a user device of the network depicted in FIG. 1.

FIG. 2 is an exemplary diagram of a device 200 that may correspond to any of STB 120, server 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
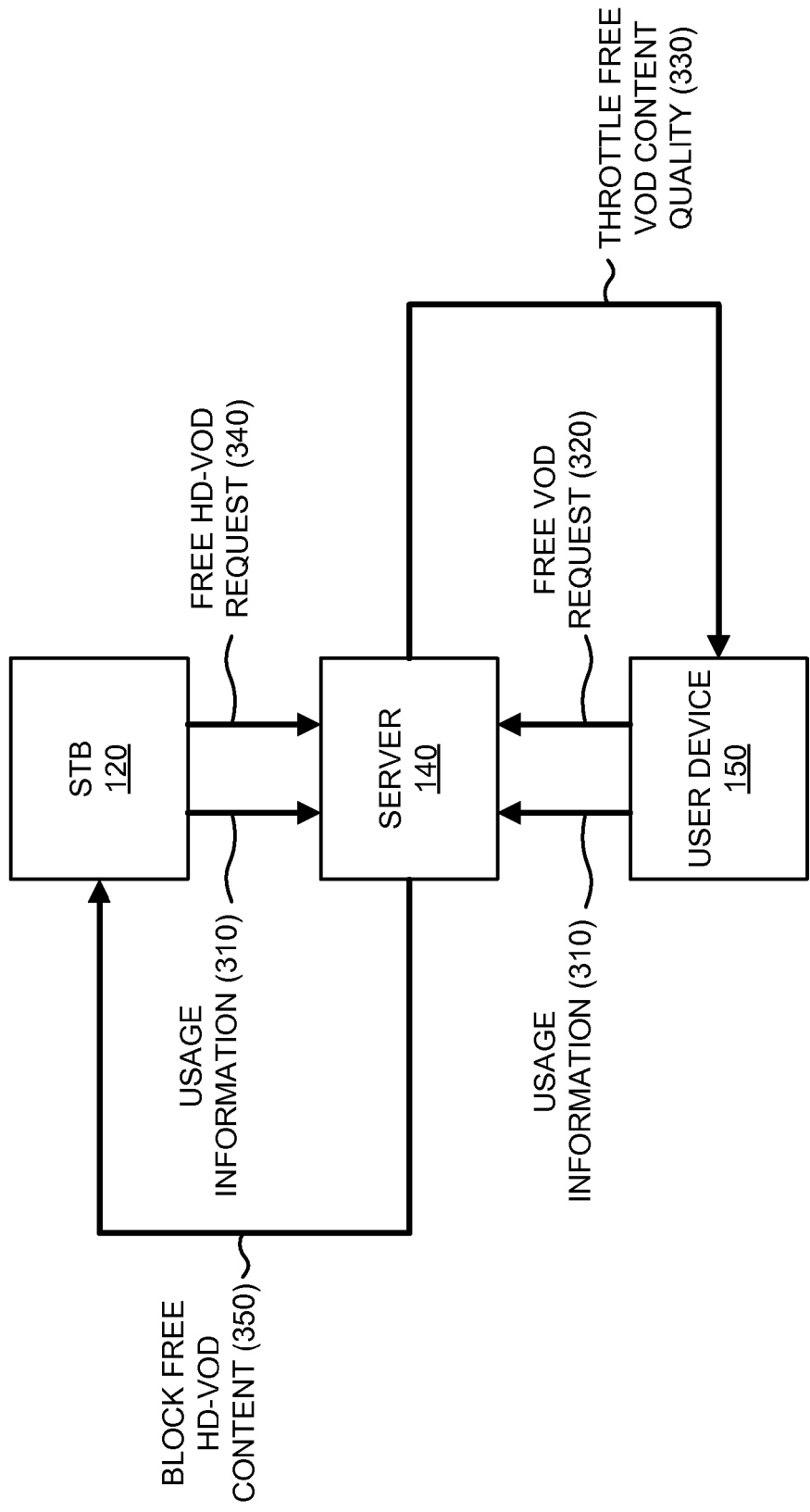
FIG. 3 depicts a diagram of an exemplary portion of the network illustrated in FIG. 1.

FIG. 3 depicts a diagram of an exemplary portion 300 of network 100. As illustrated, exemplary network portion 300 may include STB 120, server 140, and user device 150. STB 120, server 140, and user device 150 may include the features described above in connection with, for example, FIG. 1.

As further shown in FIG. 3, server 140 may receive usage information 310 from STB 120 and/or user device 150. Usage information 310 may include information associated with VOD content and/or HD-VOD content. For example, usage information 310 may include user demand (e.g., a number of orders for one or more of VOD content and/or HD-VOD content, programming associated with one or more of VOD content and/or HD-VOD content, etc.); identification information associated with STBs and/or user devices (e.g., STB 120 and/or user device 150) receiving VOD content and/or HD-VOD content; customer information (e.g., customer names, demographics (e.g., race, age, income, disabilities, educational attainment, home ownership, employment status, location, etc.) associated with customers associated with STBs and/or user devices receiving VOD content and/or HD-VOD content; whether the user demand is for free or fee-based VOD content and/or HD-VOD content; daily usage information (e.g., low, medium, high, etc.) associated with VOD content and/or HD-VOD content; etc.

Server 140 may use usage information 310 to assign a cost factor to each customer associated with STBs and/or user devices providing usage information 310. For example, in one implementation, server 140 may calculate a cost factor for each customer by assigning equal (or substantially equal) weights to criteria associated with usage information 310. The criteria associated with usage information 310 may include, for example, a number of HD-VOD content consumed by the customer, a number of VOD content consumed by the customer, a ratio of free versus paid usage of HD-VOD content and/or VOD content, daily usage of HD-VOD content and/or VOD content, etc. For example, server 140 may assign equal weights to each of these criteria (e.g., a weight of 0.25 for each of the four criteria), may multiply the weights by the values associated with the criteria, and may add the results together to obtain the cost factor, as set forth according to the following equation:

$$\text{Cost Factor} = (\text{Weight} \times \text{Criteria1}) + (\text{Weight} \times \text{Criteria2}), \ldots + (\text{Weight} \times \text{Criteria}N).$$

In another implementation, server 140 may calculate a cost factor for each customer by assigning different weights to the criteria (e.g., a number of HD-VOD content consumed by the customer, a number of VOD content consumed by the customer, free versus paid usage of HD-VOD content and/or VOD content, daily usage of HD-VOD content and/or VOD content, etc.) associated with usage information 310. For example, server 140 may assign different weights to each of the criteria, may multiply the weights by the values associated with the criteria, and may add the results together to obtain the cost factor, as set forth according to the following equation:

$$\text{Cost Factor} = (\text{Weight1} \times \text{Criteria1}) + (\text{Weight2} \times \text{Criteria2}), \ldots + (\text{Weight}N \times \text{Criteria}N).$$

Server 140 may compare the calculated cost factor for each customer to a threshold, and may determine a customer to be an "expensive" customer (e.g., customers using primarily free VOD and/or HD-VOD content) if their associated cost factor exceeds the threshold. In other implementations, server 140 may determine a customer to be an "expensive" customer if their associated cost factor is less than or equal to the threshold. As further shown in FIG. 3, user device 150 may generate a request 320 for free VOD content (e.g., via a customer selecting free VOD content), and server 140 may receive free VOD request 320 from user device 150. If the customer associated with user device 150 is determined to be an "expensive" customer, server 140 may throttle free VOD content quality 330 provided to user device 150. For example, in one implementation, server 140 may throttle the free VOD content quality by reducing video quality (e.g., resolution, number of pixels, etc.) associated with the free VOD content (e.g., by a factor, such as two times). Server 140 may also provide a message to user device 150 (e.g., for display) indicating that the quality of the free VOD content is reduced (e.g., a message, such as "Video quality reduced.").

As also shown in FIG. 3, STB 120 may generate a request 340 for free HD-VOD content (e.g., via a customer selecting free HD-VOD content), and server 140 may receive free HD-VOD request 340 from STB 120. If the customer associated with STB 120 is determined to be an "expensive" customer, server 140 may block or prevent free HD-VOD content 350 from being provided to STB 120. For example, in one implementation, server 140 may prevent free HD-VOD content from being sent to STB 120, and may send a message to STB 120 (e.g., for display via television 110) indicating that the free HD-VOD content is blocked (e.g., a message, such as "Free HD-VOD content currently blocked. Contact customer service.").

Such an arrangement, as depicted in FIG. 3, may enable companies (e.g., companies providing VOD content and/or HD-VOD content) to reduce or eliminate expensive customers (e.g., customers using primarily free VOD and/or HD-VOD content), circumvent bulk recording of free VOD and/or HD-VOD content by hackers, and/or reduce purchase PIN misuse by unauthorized users. For example, with the arrangement depicted in FIG. 3, an "expensive" customer may become disenfranchised with the reduced free VOD content quality or the inability to view free HD-VOD content, and may begin purchasing fee-based VOD and/or HD-VOD content. Alternatively and/or additionally, an "expensive" customer may contact customer service (e.g., associated with the company), and may be informed that fee-based VOD content may be provided at a higher quality and/or that fee-based HD-VOD content may not be blocked. Such an arrangement may categorize hackers (e.g., bulk recorders) as "expensive" customers (e.g., since they may primarily select free VOD and/or HD-VOD content for bulk recording), and may categorize unauthorized users of purchase PINs as "expensive" customers (e.g., since they may primarily use the purchase PINs to select free VOD and/or HD-VOD content). Thus, hackers and/or unauthorized users of purchase PINs may be blocked from free HD-VOD content and may become disenfranchised with the reduced free VOD content quality.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300. For example, although FIG. 3 shows STB 120 requesting free HD-VOD content and user device 150 requesting free VOD content, in other implementations, STB 120 may request free VOD content and user device 150 may request free HD-VOD content. In another example, server 140 may block VOD content from being provided to STB 120 and/or user device 150 in a manner similar to the manner that HD-VOD content is blocked.

Figure 4:
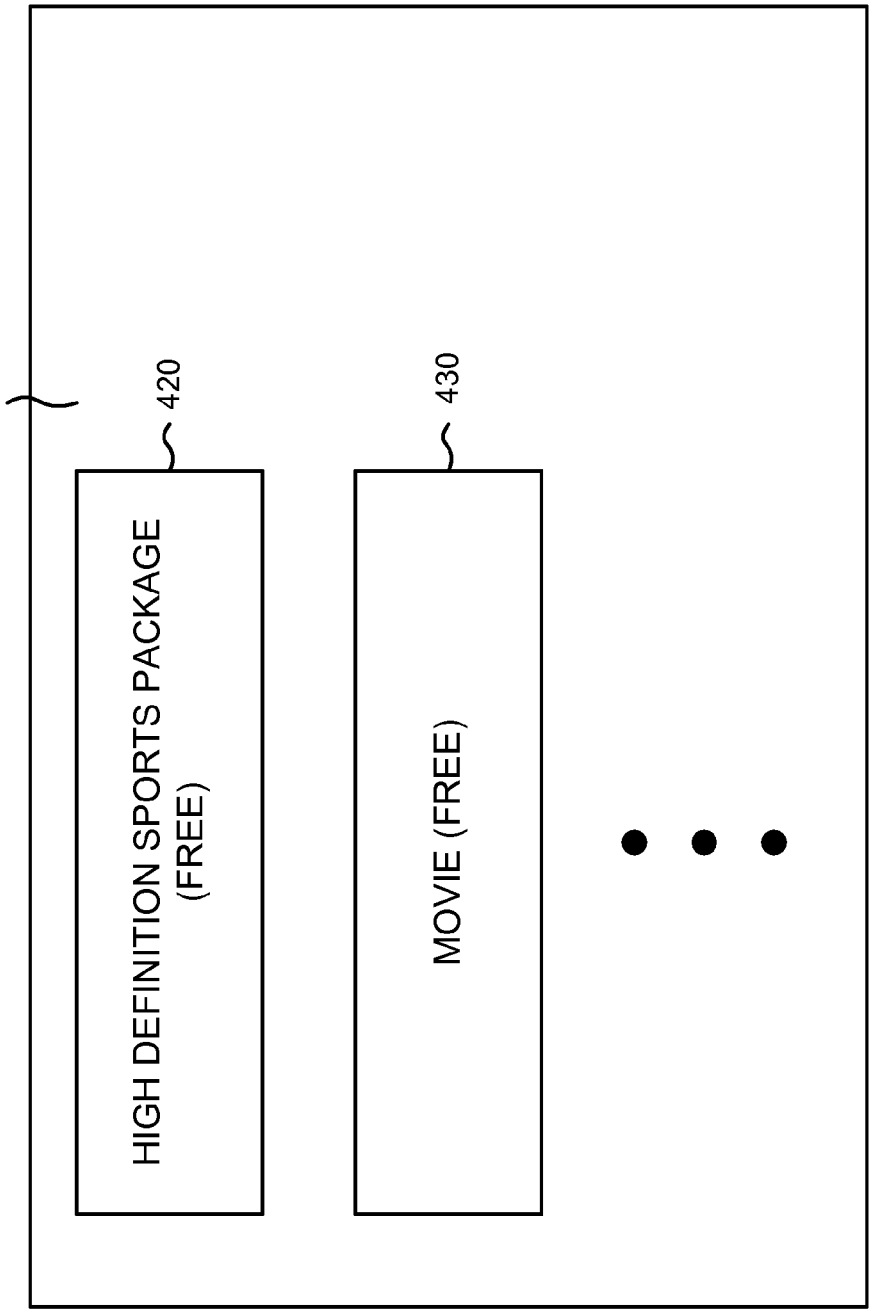
FIGS. 4-6 illustrate diagrams of exemplary user interfaces capable of being generated by the STB, the server, and/or the user device of the network depicted in FIG. 1.

FIG. 4 illustrates a diagram of an exemplary user interface 400 capable of being generated by STB 120, server 140, and/or user device 150 (e.g., and displayed via television 110 and/or user device 150). User interface depicted in FIG. 4, and each of the user interfaces depicted in FIGS. 5 and 6 and described below (collectively referred to as "the user interfaces"), may include a graphical user interface (GUI) or a non-graphical user interface, such as a text-based interface. The user interfaces may provide information to users via a customized interface (e.g., a proprietary interface) and/or other types of interfaces (e.g., a browser-based interface, a television interface, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 4, user interface 400 may include a video-on-demand menu 410, a free high definition sports package 420, and/or a free movie 430. Information associated with user interface 400 may be selected by a user of STB 120 (e.g., via remote control 130) and/or user device 150.

Video-on-demand menu 410 may include a program guide provided by STB 120 and/or user device 150, a video-on-demand menu (e.g., that includes titles, categories, packages, etc.) provided by STB 120 and/or user device 150, information associated with the program guide and/or video-on-demand menu (e.g., preview, purchase, costs, etc.), advertisements, etc.

Free high definition sports package 420 may include a button, an icon, a link, and/or other similar selection mechanisms (e.g., instructions) associated with a free high definition sports package (e.g., a football game provided by the NFL network, a basketball game provided by the NBA network, etc.). For example, free high definition sports package 420 may include information explaining the offered package (e.g., week two football game between the Philadelphia Eagles and the New York Giants), instructions on how to select the offered package (e.g., "Highlight package and then select OK."), etc.

Free movie 430 may include a button, an icon, a link, and/or other similar selection mechanisms (e.g., instructions) associated with a free movie (e.g., a children's movie provided by the Disney channel, an original movie provided by the A&E network, etc.). For example, free movie 430 may include information explaining the offered movie (e.g., a Disney channel original movie), instructions on how to select the offered movie (e.g., "Highlight movie and then select OK."), etc.

Although user interface 400 depicts a variety of information, in other implementations, user interface 400 may depict fewer, different, or additional information than depicted in FIG. 4. For example, additional types of VOD and/or HD-VOD content (e.g., cartoons, episodes for a television series, fee-based VOD and/or HD-VOD content, etc.) may be provided by user interface 400. In another example, one or more advertisements, instructions, etc. may be provided in a side bar area of user interface 400.

Figure 5:
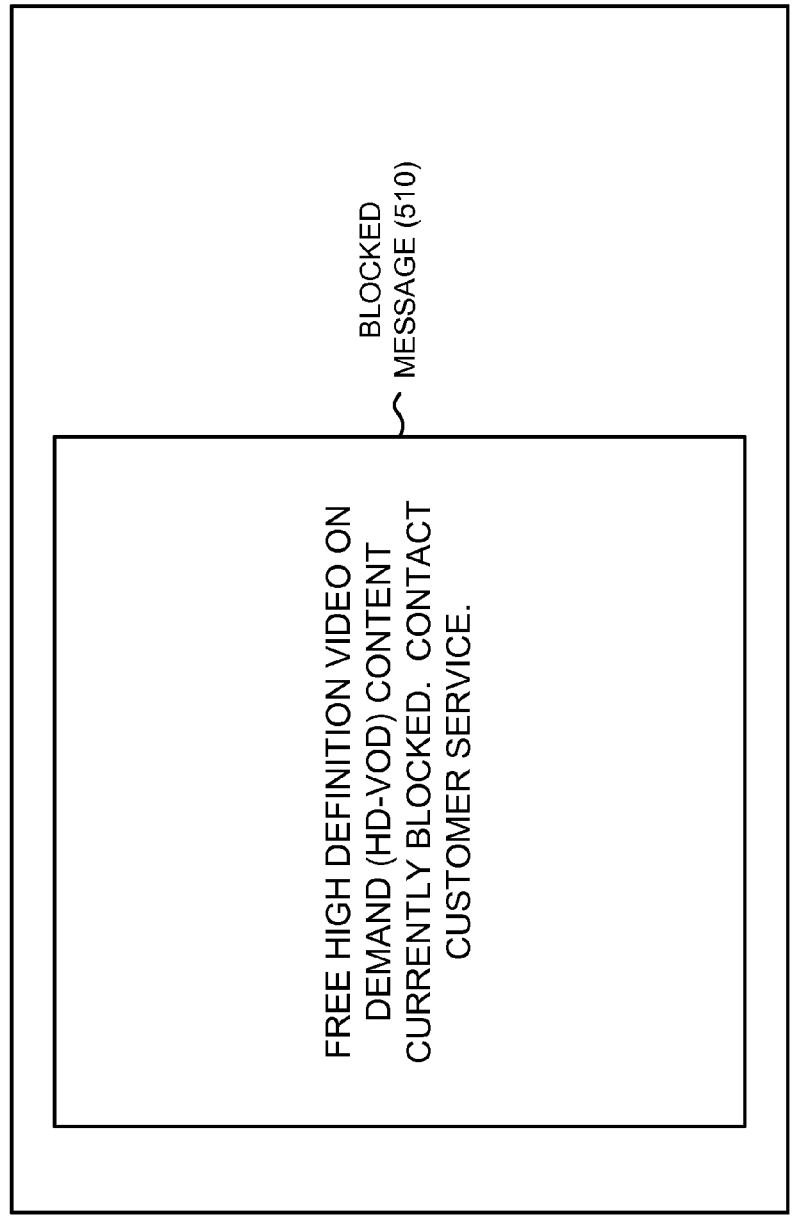

FIG. 5 depicts a diagram of an exemplary user interface 500 capable of being generated by STB 120, server 140, and/or user device 150 (e.g., and displayed via television 110 and/or user device 150). As illustrated, user interface 500 may include a blocked message 510. Information associated with user interface 500 may be selected by a user of STB 120 (e.g., via remote control 130) and/or user device 150.

Blocked message 510 may include a message indicating that the free HD-VOD content is blocked (e.g., a message, such as "Free HD-VOD content currently blocked. Contact customer service."), a message indicating that free VOD content is blocked, etc. In one implementation, server 140 may provide blocked message 510, and may prevent free HD-VOD content from being sent to STB 120 and/or user device 150 (e.g., in conjunction with block free HD-VOD content 350, as described above in connection with FIG. 3). In other implementations, server 140 may provide blocked message 510, and may prevent free VOD content from being sent to STB 120 and/or user device 150. If an "expensive" customer associated with STB 120 and/or user device 150 receives blocked message 510, the customer may become disenfranchised with the inability to view free HD-VOD content, and may begin purchasing fee-based VOD and/or HD-VOD content. Alternatively and/or additionally, the "expensive" customer may contact customer service (e.g., associated with the company), and may be informed that fee-based HD-VOD content may not be blocked.

Although user interface 500 depicts a variety of information, in other implementations, user interface 500 may depict fewer, different, or additional information than depicted in FIG. 5. For example, blocked message 510 may include additional instructions, such as "You have depleted your quota for free HD-VOD content. Please consider purchasing other HD-VOD content."

Figure 6:
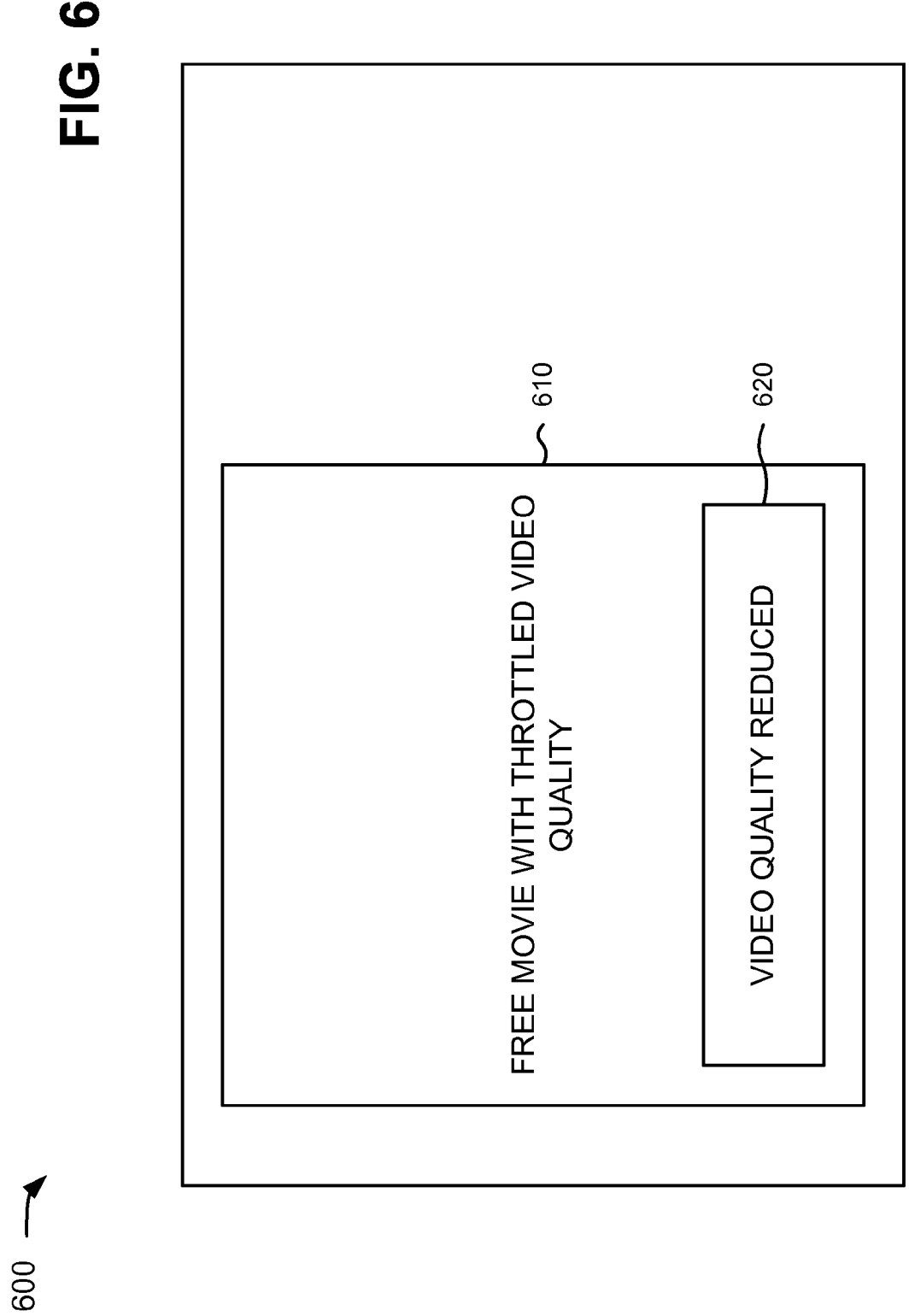

FIG. 6 depicts a diagram of an exemplary user interface 600 capable of being generated by STB 120, server 140, and/or user device 150 (e.g., and displayed via television 110 and/or user device 150). As illustrated, user interface 600 may include a free movie 610 and/or a video quality message 620. Information associated with user interface 600 may be selected by a user of STB 120 (e.g., via remote control 130) and/or user device 150.

Free movie 610 may include a free movie with throttled video quality. For example, in one implementation, server 610 may throttle the quality of free movie 610 by reducing video quality (e.g., resolution, number of pixels, etc.) associated with free movie 610 by a factor (e.g., in conjunction with throttle free VOD content quality 330, as described above in connection with FIG. 3). Free movie 610 may include a standard format movie with reduced video quality and/or a high definition format movie with reduced video quality. If an "expensive" customer associated with STB 120 and/or user device 150 receives free movie 610, the customer may become disenfranchised with the reduced quality of free movie 610, and may begin purchasing fee-based VOD and/or HD-VOD content. Alternatively and/or additionally, the "expensive" customer may contact customer service (e.g., associated with the company), and may be informed that fee-based VOD content and/or HD-VOD content may not experience reduced quality.

Video quality message 620 may include a message indicating that the quality of free movie 610 is reduced (e.g., a message, such as "Video quality reduced."). For example, in one implementation, server 140 may provide video quality message 620, with free movie 610, to STB 120 and/or user device 150. In other implementations, video quality message 620 may include additional information, such as "Video quality is reduced for free content. If you would like to purchase high quality content, please consider purchasing our other VOD and/or HD-VOD content." Video quality message 620 may be provided for a predetermined time period, or, alternatively, intermittently throughout display of free movie 610.

Although user interface 600 depicts a variety of information, in other implementations, user interface 600 may depict fewer, different, or additional information than depicted in FIG. 6.

Figure 7:
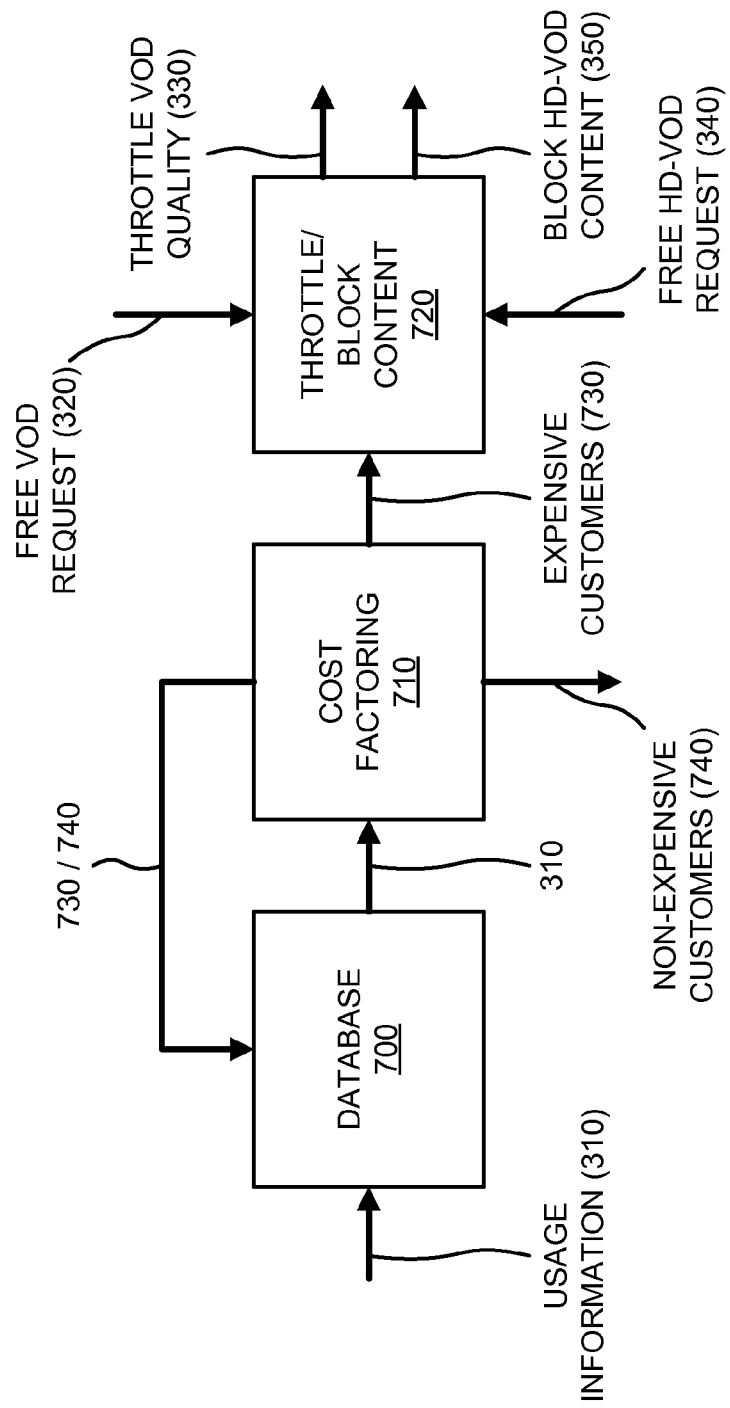
FIGS. 7 and 8 depict diagrams of exemplary functional components of the server of the network illustrated in FIG. 1.

FIG. 7 depicts a diagram of exemplary functional components of server 140. As illustrated, server 140 may include a database 700, cost factoring logic 710, and/or throttle/block content logic 720. The functions described in FIG. 7 may be performed by one or more of the exemplary components of device 200 depicted in FIG. 2.

Database 700 may include a storage device (e.g., main memory 230, ROM 240, storage device 250, etc.) that may store information received by server 140. In one implementation, database 700 may store information described below in connection with a database portion 900 (FIG. 9). For example, as shown in FIG. 7, database 700 may receive usage information 310 (e.g., from STB 120, user device 150, and/or other sources), and may store usage information 310.

Cost factoring logic 710 may include any hardware, software, or combination of hardware and software based logic (e.g., processing logic 220) that receives usage information 310 from database 700, and identifies (or determines) one or more expensive customers 730 and/or one or more non-expensive customers 740 based on usage information 310. In one implementation, cost factoring logic 710 may use usage information 310 to assign a cost factor to each customer associated with STBs and/or user devices providing usage information 310. For example, cost factoring logic 710 may calculate a cost factor for each customer by assigning equal weights to criteria associated with usage information 310. In another example, cost factoring logic 710 may calculate a cost factor for each customer by assigning different weights to the criteria associated with usage information 310. Cost factoring logic 710 may compare the calculated cost factor for each customer to a threshold, and may determine a customer to be an "expensive" customer if their associated cost factor exceeds (or is less than or equal to) the threshold. Cost factoring logic 710 may determine a customer that is not an "expensive" customer to be a "non-expensive" customer. Cost factoring logic 710 may provide information (e.g., identification, names, etc.) associated with expensive customers 730 to throttle/block content logic 720, and may output information (e.g., identification, names, etc.) associated with non-expensive customers 740. Cost factoring logic 710 may provide information associated with expensive customers 730 and/or non-expensive customers 740 to database 700 for storage.

Throttle/block content logic 720 may include any hardware, software, or combination of hardware and software based logic (e.g., processing logic 220) that receives information associated with expensive customers 730 from cost factoring logic 710, receives free VOD request 320 (e.g., from STB 120 and/or user device 150), and receives free HD-VOD request 340 (e.g., from STB 120 and/or user device 150). In one implementation, if the customer associated with free VOD request 320 is determined to be an "expensive" customer (e.g., based on information associated with expensive customers 730), throttle/block content logic 720 may throttle free VOD content quality 330 (e.g., by reducing video quality, such as resolution, number of pixels, etc.) associated with the free VOD content. If the customer associated with free HD-VOD request 340 is determined to be an "expensive" customer, throttle/block content logic 720 may block free HD-VOD content 350 (e.g., may prevent free HD-VOD content from being sent to STB 120 and/or user device 150).

Although FIG. 7 shows exemplary functional components of server 140, in other implementations, server 140 may contain fewer, different, or additional functional components than depicted in FIG. 7. In still other implementations, one or more functional components of server 140 may perform one or more other tasks described as being performed by one or more other functional components of server 140.

Figure 8:
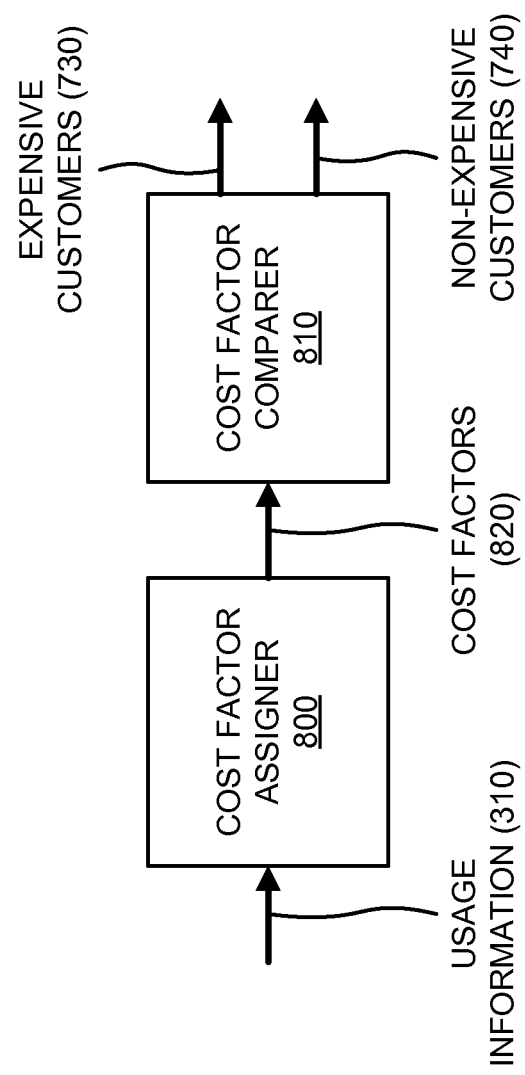

FIG. 8 depicts a diagram of exemplary functional components of cost factoring logic 710. As illustrated, cost factoring logic 710 may include cost factor assigner logic 800 and/or cost factor comparer logic 810. The functions described in FIG. 8 may be performed by one or more of the exemplary components of device 200 depicted in FIG. 2.

Cost factor assigner logic 800 may include any hardware, software, or combination of hardware and software based logic (e.g., processing logic 220) that receives usage information 310 from database 700, and determines cost factors 820 for one or more customers based on usage information 310. In one implementation, cost factor assigner logic 800 may calculate cost factors 820 for customers by assigning (or substantially equal) equal weights to criteria (e.g., a number of HD-VOD content consumed by the customer, a number of VOD content consumed by the customer, free versus paid usage of HD-VOD content and/or VOD content, daily usage of HD-VOD content and/or VOD content, etc.) associated with usage information 310. For example, cost factor assigner logic 800 may assign equal (or substantially equal) weights to each of these criteria according to the following equation:

Cost Factor=(Weight×Criteria1)+(Weight×Criteria2), . . . +(Weight×CriteriaN).

In another implementation, cost factor assigner logic 800 may calculate cost factors 820 for customers by assigning different weights to the criteria associated with usage information 310 according to the following equation:

Cost Factor=(Weight1×Criteria1)+(Weight2×Criteria2), . . . +(WeightN×CriteriaN).

Cost factor comparer logic 810 may include any hardware, software, or combination of hardware and software based logic (e.g., processing logic 220) that receives cost factors 820 from cost factor assigner logic 800, and identifies (or determines) expensive customers 730 and non-expensive customers 740 based on cost factors 820. In one implementation, cost factor comparer logic 810 may compare cost factors 820 for the customers to a threshold, and may determine customers to be expensive customers 730 if the associated cost factors 820 exceed the threshold. In other implementations, cost factor comparer logic 810 may determine customers to be expensive customers 730 if the associated cost factors 820 equal and/or are below the threshold. Cost factor comparer logic 810 may determine customers to be non-expensive customers 740 if they are not deemed to be expensive customers 730.

Although FIG. 8 shows exemplary functional components of cost factoring logic 710, in other implementations, cost factoring logic 710 may contain fewer, different, or additional functional components than depicted in FIG. 8. In still other implementations, one or more functional components of cost factoring logic 710 may perform one or more other tasks described as being performed by one or more other functional components of cost factoring logic 710.

FIG. 9 illustrates a diagram of a portion 900 of an exemplary database capable of being provided in and/or managed by server 140. As illustrated, database portion 900 may include a variety of information associated with customers, STBs, user devices, VOD content usage, and/or HD-VOD usage. For example, database portion 900 may include a customer information field 910, a STB/user device identification (ID) field 920, a number of HD-VODs used field 930, a number of VODs used field 940, a free/paid field 950, a daily usage field 960, and/or a variety of entries 970 associated with fields 910-960.

Customer information field 910 may include information associated with customers (e.g., of VOD content and/or HD-VOD content provided by server 140), such as customer identification, customer name, customer address, customer demographics, etc. For example, customer information field 910 may include entries for "John Doe," "Bob Smith," "Fred Jones," etc. In one example, each entry in customer information field 910 may include an identifier for a customer (e.g., an account number, a password, etc.), the customer's name, customer contact information (e.g., address, telephone number, email address, etc.), etc.

STB/user device ID field 920 may include entries 970 providing identification information for STBs and/or user devices associated with the customers provided in customer information field 910. For example, STB/user device ID field 920 may include entries 970 for "ID1," "ID2," "ID3," etc. In one implementation, each of the IDs provided in STB/user device ID field 920 may include identification information (e.g., numbers, letters, a combination of numbers and letters, etc.) associated with STBs and/or user devices to which VOD content and/or HD-VOD content is provided.

Number of HD-VODs field 930 may include entries 970 providing numbers of HD-VODs ordered by customers provided in customer information field 910. For example, number of HD-VODs field 930 may indicate that "John Doe" (e.g., provided in customer information field 910) ordered five (5) HD-VODs during a certain time period, that "Bob Smith" (e.g., provided in customer information field 910) ordered six (6) HD-VODs during the certain time period, and that "Fred Jones" (e.g., provided in customer information field 910) ordered seven (7) HD-VODs during the certain time period.

Number of VODs field 940 may include entries 970 providing numbers of VODs ordered by customers provided in customer information field 910. For example, number of VODs field 940 may indicate that "John Doe" (e.g., provided in customer information field 910) ordered one (1) VOD during the certain time period, that "Bob Smith" (e.g., provided in customer information field 910) ordered two (2) VODs during the certain time period, and that "Fred Jones" (e.g., provided in customer information field 910) ordered three (3) VODs during the certain time period.

Free/paid field 950 may include entries 970 providing information (e.g., whether the content was free or fee-based) associated with the HD-VODs provided in number of HD-VODs field 930 and/or the VODs provided in number of VODs field 940. For example, free/paid field 950 may indicate that "John Doe" and "Bob Smith" (e.g., provided in customer information field 910) paid for a majority of the HD-VODs (e.g., provided in number of HD-VODs field 930) and the VODs (e.g., provided in number of VODs field 940), and that the majority of HD-VODs (e.g., provided in number of HD-VODs field 930) and the VODs (e.g., provided in number of VODs field 940) ordered by "Fred Jones" (e.g., provided in customer information field 910) were free. In one exemplary implementation (not shown), free/paid field 950 may provide an indication (e.g., a percentage, a ratio, etc.) of the content (e.g., provided in number of HD-VODs field 930 and/or number of VODs field 940) that was free and/or fee-based (e.g., 75% of the content used was free and 25% of the content used was fee-based).

Daily usage field 960 may include entries 970 providing usage information (e.g., daily usage of HD-VOD and/or VOD content) associated with the customers provided in customer information field 910. For example, daily usage field 960 may indicate that "John Doe" and "Bob Smith" (e.g., provided in customer information field 910) have low daily usage of HD-VOD and/or VOD content (e.g., "Low"), and that "Fred Jones" (e.g., provided in customer information field 910) has high daily usage of HD-VOD and/or VOD content (e.g., "High").

As further shown in FIG. 9, the information provided in database portion 900 may be utilized (e.g., by server 140) to determine customers (e.g., provided in customer information field 910) that have high cost factors. For example, server 140 may determine that a customer (e.g., "Fred Jones" provided in customer information field 910) has a high cost factor 980 based on the information provided in database portion 900. Accordingly, server 140 may determine that "Fred Jones" is an expensive customer, may block HD-VOD content from being provided to "Fred Jones" (e.g., to the STB and/or the user device associated with "Fred Jones"), and/or may throttle the quality of VOD content provided to "Fred Jones."

Although FIG. 9 shows exemplary information that may be provided in database portion 900, in other implementations, database portion 900 may contain fewer, different, or additional information than depicted in FIG. 9.

FIGS. 10 and 11 illustrate flow charts of an exemplary process 1000 for enabling companies to reduce or eliminate expensive customers, circumvent bulk recording of free VOD and/or HD-VOD content by hackers, and/or reduce purchase PIN misuse by unauthorized users, according to implementations described herein. In one implementation, process 1000 may be performed by server 140. In another implementation, some or all of process 1000 may be performed by another device or group of devices, including or excluding server 140.

As illustrated in FIG. 10, process 1000 may begin with receipt, from a set-top box (STB) and/or a user device, of usage information associated with VOD and/or HD-VOD content (block 1010), and calculation of a cost factor, based on the usage information, for a customer associated with the STB and/or the user device (block 1020). For example, in implementations described above in connection with FIG. 3, server 140 may receive, from STB 120 and/or user device 150, usage information 310 (e.g., information associated with VOD content and/or HD-VOD content, user demand, identification information associated with STBs and/or user devices, customer information, whether the user demand is for free or fee-based VOD content and/or HD-VOD content, daily usage information associated with VOD content and/or HD-VOD content, etc.). Server 140 may use usage information 310 to assign a cost factor to each customer associated with STBs and/or user devices providing usage information 310. In one example, server 140 may calculate a cost factor for each customer by assigning equal (or different) weights to criteria (e.g., a number of HD-VOD content consumed by the customer, a number of VOD content consumed by the customer, free versus paid usage of HD-VOD content and/or VOD content, daily usage of HD-VOD content and/or VOD content, etc.) associated with usage information 310.

As further shown in FIG. 10, the cost factor may be compared to a threshold (block 1030). For example, in implementations described above in connection with FIG. 3, server 140 may compare the calculated cost factor for each customer to a threshold, and may determine a customer to be an "expensive" customer if their associated cost factor exceeds the threshold. In other implementations, server 140 may determine a customer to be an "expensive" customer if their associated cost factor is less than or equal to the threshold.

Returning to FIG. 10, a request for free HD-VOD content may be received from the STB and/or the user device (block 1040), and the free HD-VOD content may be blocked from being provided to the STB and/or the user device when the cost factor exceeds the threshold (block 1050). For example, in implementations described above in connection with FIG. 3, server 140 may receive free HD-VOD request 340 from STB 120. If the customer associated with STB 120 is determined to be an "expensive" customer, server 140 may block free HD-VOD content 350 from being provided to STB 120. In one example, server 140 may prevent free HD-VOD content from being sent to STB 120, and may send a message to STB 120 (e.g., for display via television 110) indicating that the free HD-VOD content is blocked (e.g., a message, such as "Free HD-VOD content currently blocked. Contact customer service.").

Alternatively and/or additionally, a request for free VOD content may be received from the STB and/or the user device (block 1060), and throttled quality free VOD content may be provided to the STB and/or the user device when the cost factor exceeds the threshold (block 1070). For example, in implementations described above in connection with FIG. 3, server 140 may receive free VOD request 320 from user device 150. If the customer associated with user device 150 is determined to be an "expensive" customer, server 140 may throttle free VOD content quality 330 provided to user device 150. In one example, server 140 may throttle the free VOD content quality by reducing video quality (e.g., resolution, number of pixels, etc.) associated with the free VOD content (e.g., by a factor, such as two times). Server 140 may also provide a message to user device 150 (e.g., for display) indicating that the quality of the free VOD content is reduced (e.g., a message, such as "Video quality reduced.").

Process block 1020 may include the process blocks depicted in FIG. 11. As shown in FIG. 11, process block 1020 may include assigning equal (or substantially equal) weights to criteria associated with the usage information (block 1100), and calculating the cost factor based on the criteria assigned equal weights (block 1110). For example, in implementations described above in connection with FIG. 3, server 140 may calculate a cost factor for each customer by assigning equal weights to criteria associated with usage information 310. The criteria associated with usage information 310 may include, for example, a number of HD-VOD content consumed by the customer, a number of VOD content consumed by the customer, free versus paid usage of HD-VOD content and/or VOD content, daily usage of HD-VOD content and/or VOD content, etc. Server 140 may assign equal (or substantially equal) weights to each of these criteria, may multiply the weights by the values associated with the criteria, and may add the results together to obtain the cost factor.

Alternatively, process block 1020 may include assigning different weights to criteria associated with the usage information (block 1120), and calculating the cost factor based on the criteria assigned different weights (block 1130). For example, in implementations described above in connection with FIG. 3, server 140 may calculate a cost factor for each customer by assigning different weights to the criteria (e.g., a number of HD-VOD content consumed by the customer, a number of VOD content consumed by the customer, free versus paid usage of HD-VOD content and/or VOD content, daily usage of HD-VOD content and/or VOD content, etc.) associated with usage information 310. Server 140 may assign different weights to each of the criteria, may multiply the weights by the values associated with the criteria, and may add the results together to obtain the cost factor.

Systems and/or methods described herein may enable companies to reduce or eliminate expensive customers, circumvent bulk recording of free VOD and/or HD-VOD content by hackers, and/or reduce purchase PIN misuse by unauthorized users. In one implementation, for example, the systems and/or methods may receive, from a set-top box (STB) and/or a user device, usage information associated with VOD and/or HD-VOD content, may calculate a cost factor, based on the usage information, for a customer associated with the STB and/or the user device, and may compare the cost factor to a threshold. The systems and/or methods may receive a request for free HD-VOD content from the STB and/or the user device, and may block (e.g., transmission of) the free HD-VOD content to the STB and/or the user device when the cost factor exceeds the threshold. Alternatively and/or additionally, the systems and/or methods may receive a request for free VOD content from the STB and/or the user device, and may provide throttled quality free VOD content to the STB and/or the user device.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 10 and 11, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device and from one or more of a set-top box (STB) or a user device, usage information associated with video content,
   the usage information being based on:
      an amount of video content provided to at least one of the STB or the user device during a first time period, and
      a type of video content provided to at least one of the STB or the user device during the first time period;
   calculating, by the device and based on the usage information, a customer-specific cost factor for a customer associated with one or more of the set-top box (STB) or the user device;
   assigning, by the device, the customer-specific cost factor to the customer;
   comparing, by the device, the customer-specific cost factor to a threshold;
   receiving, by the device and from one or more of the set-top box (STB) or the user device, a request for free video content at a second time period,
   the second time period being after the first time period; and
   performing, by the device, at least one of:
      providing reduced quality free video content to one or more of the set-top box (STB) or the user device when the customer-specific cost factor exceeds the threshold, or
      blocking transmission of free high definition video content to one or more of the set-top box (STB) or the user device when the customer-specific cost factor exceeds the threshold.

2. The computing device-implemented method of claim 1, where the video content comprises video on demand (VOD) content and high definition video on demand (HD-VOD) content.

3. The computing device-implemented method of claim 1, further comprising:
   determining the customer to be an expensive customer when the customer-specific cost factor exceeds the threshold;
   determining the customer to be a non-expensive customer when the customer-specific cost factor is less than or equal to the threshold; and
   storing an identification of the customer as one of an expensive customer or a non-expensive customer in a memory.

4. The computing device-implemented method of claim 3, further comprising:

providing the reduced quality free video content to one or more of the set-top box (STB) or the user device associated with the customer when the customer is an expensive customer; and
preventing transmission of free high definition video content to one or more of the set-top box (STB) or the user device associated with the customer when the customer is an expensive customer.

5. The computing device-implemented method of claim 1, where calculating a customer-specific cost factor comprises one of:
calculating the customer-specific cost factor based on an equal weight assigned to criteria associated with the usage information; or
calculating the customer-specific cost factor based on different weights assigned to the criteria associated with the usage information.

6. The computing device-implemented method of claim 5, where the criteria comprises one or more of:
a number of high definition video content consumed by the customer;
a number of video content consumed by the customer;
usage of free versus fee-based high definition video content and video content by the customer; or
daily usage of high definition video content and video content by the customer.

7. The computing device-implemented method of claim 5, where:
calculating the customer-specific cost factor based on an equal weight comprises:
multiplying each of the criteria by the equal weight to obtain a first result, and
adding the first results together to obtain the customer-specific cost factor; and
calculating the customer-specific cost factor based on different weights comprises:
multiplying each of the criteria by a corresponding different weight to obtain a second result, and
adding the second results together to obtain the customer-specific cost factor.

8. The computing device-implemented method of claim 1, where the computing device comprises a server.

9. The computing device-implemented method of claim 1, where the usage information comprises one or more of:
customer demand for video content and high definition video content;
identification information associated with one or more of the set-top box (STB) or the user device;
information associated with the customer;
whether the customer demand is for free or fee-based video content and high definition video content; or
daily usage information associated with video content and high definition video content.

10. The computing device-implemented method of claim 1, where the video content comprises one or more of:
subscription video on-demand (SVOD),
television-based video on-demand (VOD),
on-demand television,
movies-on-demand,
content on demand,
on-demand programming,
video on-demand (VOD) on the web,
video on-demand (VOD) on cable,
pay-as-you-go (PAYG),
pay-per-view (PPV),
all day movies,
on-demand streaming video,
Internet-on-demand video,
Internet Protocol (IP)-based video,
Internet high definition television (HDTV),
webcasting,
broadcast Internet, or
a television programming package.

11. The computing device-implemented method of claim 10, where the high definition video content comprises video on demand (VOD) content provided in a high definition format.

12. The computing device-implemented method of claim 1, where providing reduced quality free video content comprises one or more of:
reducing a resolution associated with the free video content; or
reducing a number of pixels associated with the free video content.

13. The computing device-implemented method of claim 1, where the user device comprises one or more of:
a radiotelephone;
a personal communications system (PCS) terminal;
a personal digital assistant (PDA);
a laptop; or
a personal computer.

14. A device comprising:
a memory to store a plurality of instructions; and
a processor to execute instructions in the memory to:
receive, from one or more of a set-top box (STB) or a user device, usage information associated with video on demand (VOD) content and high definition video on demand (HD-VOD) content,
the usage information being based on:
an amount of video on demand (VOD) content and high definition video on demand (HD-VOD) content provided to at least one of the STB or the user device during a first time period, and
a type of video on demand (VOD) content and high definition video on demand (HD-VOD) content provided to at least one of the STB or the user device during the first time period,
calculate a customer-specific cost factor, based on the usage information, for a customer associated with one or more of the set-top box (STB) or the user device,
assign the customer-specific cost factor to the customer,
compare the customer-specific cost factor to a threshold,
provide reduced quality free video on demand (VOD) content to one or more of the set-top box (STB) or the user device when the customer-specific cost factor exceeds the threshold and when free video on demand (VOD) content is requested by one or more of the set-top box (STB) or the user device, and
prevent transmission of free high definition video on demand (HD-VOD) content to one or more of the set-top box (STB) or the user device when the customer-specific cost factor exceeds the threshold and when free high definition video on demand (HD-VOD) is requested by one or more of the set-top box (STB) or the user device.

15. The device of claim 14, where the processor further executes instructions in the memory to:
determine the customer to be an expensive customer when the customer-specific cost factor exceeds the threshold;
determine the customer to be a non-expensive customer when the customer-specific cost factor is less than or equal to the threshold; and
store an identification of the customer as one of an expensive customer or a non-expensive customer in a memory.

16. The device of claim 15, where the processor further executes instructions in the memory to:
provide the reduced quality free video on demand (VOD) content to one or more of the set-top box (STB) or the user device associated with the customer when the customer is an expensive customer, and
prevent transmission of the free high definition video on demand (HD-VOD) content to one or more of the set-top box (STB) or the user device associated with the customer when the customer is an expensive customer.

17. The device of claim 14, where, when calculating the customer-specific cost factor, the processor executes instructions in the memory to one of:
calculate the customer-specific cost factor based on an equal weight assigned to criteria associated with the usage information, or
calculate the customer-specific cost factor based on different weights assigned to the criteria associated with the usage information.

18. The device of claim 17, where the criteria comprises one or more of:
a number of high definition video on demand (HD-VOD) content consumed by the customer;
a number of video on demand (VOD) content consumed by the customer;
usage of free versus fee-based high definition video on demand (HD-VOD) content and video on demand (VOD) content by the customer; or
daily usage of high definition video on demand (HD-VOD) content and video on demand (VOD) content by the customer.

19. The device of claim 17, where,
when calculating the customer-specific cost factor based on an equal weight, the processor executes instructions in the memory to:
multiply each of the criteria by the equal weight to obtain a first result, and
add the first results together to obtain the customer-specific cost factor; and
when calculating the customer-specific cost factor based on different weights, the processor executes instructions in the memory to:
multiply each of the criteria by a corresponding different weight to obtain a second result, and
add the second results together to obtain the customer-specific cost factor.

20. The device of claim 14, where the device comprises a server.

21. The device of claim 14, where the usage information comprises one or more of:
customer demand for video on demand (VOD) content and high definition video on demand (HD-VOD) content;
identification information associated with one or more of the set-top box (STB) or the user device;
information associated with the customer;
whether the customer demand is for free or fee-based video on demand (VOD) content and high definition video on demand (HD-VOD) content; or
daily usage information associated with video on demand (VOD) content and high definition video on demand (HD-VOD) content.

22. The device of claim 14, where the video on demand (VOD) content comprises one or more of:
subscription video on-demand (SVOD),
television-based video on-demand (VOD),
on-demand television,
movies-on-demand,
content on demand,
on-demand programming,
video on-demand (VOD) on the web,
video on-demand (VOD) on cable,
pay-as-you-go (PAYG),
pay-per-view (PPV),
all day movies,
on-demand streaming video,
Internet-on-demand video,
Internet Protocol (IP)-based video,
Internet high definition television (HDTV),
webcasting,
broadcast Internet, or
a television programming package.

23. The device of claim 22, where the high definition video on demand (HD-VOD) content comprises video on demand (VOD) content provided in a high definition format.

24. A system comprising:
a server device to:
receive, from a device, usage information associated with video on demand (VOD) content and high definition video on demand (HD-VOD) content, the usage information being based on:
an amount of video content provided to at least one of the STB or the user device during a first time period, and
a type of video content provided to at least one of the STB or the user device during the first time period,
calculate a customer-specific cost factor, based on the usage information, for a customer associated with the device,
assign the customer-specific cost factor to the customer,
compare the customer-specific cost factor to a threshold,
provide reduced quality free video on demand (VOD) content to the device when the customer-specific cost factor exceeds the threshold and when free video on demand (VOD) content is requested by the device, and
prevent transmission of free high definition video on demand (HD-VOD) content to the device when the customer-specific cost factor exceeds the threshold and when free high definition video on demand (HD-VOD) is requested by the device; and
the device to:
provide the usage information to the server,
provide a request for free video on demand (VOD) content to the server,
receive, from the server, the reduced quality free video on demand (VOD) content and a message indicating that the video quality of the free video on demand (VOD) content is reduced,
provide a request for free high definition video on demand (HD-VOD) content to the server, and
receive, from the server, a message indicating that free high definition video on demand (HD-VOD) content is blocked.

25. The system of claim 24, where the device comprises one of a set-top box (STB) or a user device.

* * * * *